United States Patent
Shizuku

(10) Patent No.: US 10,135,078 B2
(45) Date of Patent: *Nov. 20, 2018

(54) CURRENT COLLECTOR FOR FUEL CELL, AND FUEL CELL STACK

(71) Applicant: TOYOTA JIDOSHA KABUSHIKI KAISHA, Toyota-shi, Aichi-ken (JP)

(72) Inventor: Fumishige Shizuku, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 444 days.

This patent is subject to a terminal disclaimer.

(21) Appl. No.: 14/874,716

(22) Filed: Oct. 5, 2015

(65) Prior Publication Data

US 2016/0118672 A1   Apr. 28, 2016

(30) Foreign Application Priority Data

Oct. 15, 2014   (JP) ................................. 2014-210556

(51) Int. Cl.
*H01M 8/02* (2016.01)
*H01M 8/0247* (2016.01)
(Continued)

(52) U.S. Cl.
CPC ....... *H01M 8/0247* (2013.01); *H01M 8/0206* (2013.01); *H01M 8/0228* (2013.01); *H01M 8/24* (2013.01)

(58) Field of Classification Search
CPC ............. H01M 8/0247; H01M 8/0206; H01M 8/0228; H01M 8/24
See application file for complete search history.

(56) References Cited

U.S. PATENT DOCUMENTS 1,981,915 A   11/1934   Hormel et al.
5,677,088 A   10/1997   Kobayashi
(Continued)

FOREIGN PATENT DOCUMENTS

CN   104854746 A   8/2015
DE   112014000307 T5   9/2015
(Continued)

OTHER PUBLICATIONS

Machine English translation of JP 2008-300131.*
(Continued)

*Primary Examiner* — Michael L Dignan
(74) *Attorney, Agent, or Firm* — Finnegan, Henderson, Farabow, Garrett & Dunner, LLP

(57) ABSTRACT

In order to reduce corrosion of metal plates of a current collector which is comprised of the stacked metal plates made of different materials, a current collector for a fuel cell is provided, which includes a first metal plate that has a terminal portion and is conductive, and a second metal plate and a third metal plate that are metal plates having a higher corrosion resistance than the first metal plate and pinch the first metal plate therebetween. The current collector includes a first through-hole penetrating the first metal plate, the second metal plate, and the third metal plate, wherein fluid exists in at least either one of between the first metal plate and the second metal plate, and between the first metal plate and the third metal plate, and the first through-hole guides the fluid outside the current collector, and a first seal member blocking an end face of a perimeter of the current collector. A hole wall surface of the first through-hole is not blocked.

8 Claims, 7 Drawing Sheets

(51) Int. Cl.
*H01M 8/0228* (2016.01)
*H01M 8/24* (2016.01)
*H01M 8/0206* (2016.01)

(56) References Cited

U.S. PATENT DOCUMENTS

| | | | | |
|---|---|---|---|---|
| 8,153,333 | B2* | 4/2012 | Sugita | H01M 8/0247 |
| | | | | 429/480 |
| 8,518,603 | B2* | 8/2013 | Jang | B32B 27/18 |
| | | | | 429/520 |
| 2002/0031697 | A1 | 3/2002 | Sugita et al. | |
| 2002/0058177 | A1 | 5/2002 | Nishiyama et al. | |
| 2004/0137299 | A1* | 7/2004 | Mazza | H01M 8/0206 |
| | | | | 429/514 |
| 2004/0151952 | A1* | 8/2004 | Brady | H01M 8/0206 |
| | | | | 439/886 |
| 2006/0040159 | A1 | 2/2006 | Sato et al. | |
| 2010/0035121 | A1* | 2/2010 | Shibata | H01M 8/0247 |
| | | | | 429/413 |
| 2010/0273076 | A1 | 10/2010 | Kunitake | |
| 2011/0305976 | A1* | 12/2011 | Tanahashi | H01M 8/0273 |
| | | | | 429/535 |
| 2012/0225367 | A1* | 9/2012 | Tsubosaka | H01M 8/0236 |
| | | | | 429/480 |
| 2014/0051007 | A1* | 2/2014 | Blanchet | C25B 13/00 |
| | | | | 429/482 |
| 2016/0329577 | A1 | 11/2016 | Shizuku | |

FOREIGN PATENT DOCUMENTS

| | | | | |
|---|---|---|---|---|
| JP | 2002-93454 | | 3/2002 | |
| JP | 2004-103296 | A | 4/2004 | |
| JP | 2004-158341 | A | 6/2004 | |
| JP | 2006-100021 | A | 4/2006 | |
| JP | 2008-300131 | * | 12/2008 | H01M 8/02 |
| JP | 2008-300131 | A | 12/2008 | |
| JP | 2009-187729 | | 8/2009 | |
| JP | 2009-187729 | A | 8/2009 | |
| JP | 2010-189479 | A | 9/2010 | |
| JP | 2010-212049 | A | 9/2010 | |
| JP | 2010-282792 | A | 12/2010 | |
| JP | 5342897 | B2 | 11/2013 | |
| JP | 2015-88294 | | 5/2015 | |
| KR | 10-2015-0090209 | A | 8/2015 | |

OTHER PUBLICATIONS

Office Action issued in U.S. Appl. No. 14/655,938 dated Jul. 19, 2017.
Office Action issued in U.S. Appl. No. 14/655,938 dated Aug. 29, 2017.
Final Office Action issued in U.S. Appl. No. 14/655,938 dated Dec. 14, 2017.
Office Action issued in U.S. Appl. No. 14/655,938 dated Apr. 4, 2018.
Notice of Allowance issued in U.S. Appl. No. 14/655,938 dated Jul. 5, 2018.

* cited by examiner

CURRENT COLLECTOR FOR FUEL CELL, AND FUEL CELL STACK

CROSS REFERENCE TO RELATED APPLICATION

This application claims priority based on Japanese Patent Application No. 2014-210556, filed on Oct. 15, 2014, the contents of all of which are incorporated herein by reference in their entirety.

BACKGROUND

Field

The present invention relates to a fuel cell.

Related Art

A fuel cell stack which is constituted by stacking a plurality of unit cells has current collectors for collecting electric power generated at each unit cell and supplying the collected power to outside. Since conductivity and corrosion resistance are required for the current collector, JP2009-187729A proposes a current collector having a layered structure comprised of a metal plate of good conductivity and a metal plate of good corrosion resistance.

In JP2009-187729A, the entire surface of the two kinds of stacked metal plates is covered with a layer made of conductive resin (hereinafter, referred to as a "joining layer"), and thereby the two kinds of metal plates are joined. Thus, when a current collector is constituted by stacking a plurality of metal plates, the metal plates are joined with resin etc. while the plate surfaces of the metal plates are generally pressed against each other in order to increase the contact between the metal plates. Therefore, upon manufacturing the current collector, air which exists between the metal plates outflows from between the joining layer and the metal plates, resulting in a possible poor joining which extends continuously from the perimeter of the current collector to the inside of the current collector. When such poor joining is caused, moisture may enter into the inside space of the current collector from the perimeter of the current collector, resulting in a corrosion of the metal plates. Therefore, a technique to reduce the corrosion of the metal plates has been longed for, for the current collector which is formed by stacking different kinds of metal plates.

SUMMARY

The present invention is made in order to solve at least a part of the subject described above, and can be implemented in view of the following aspects.

(1) According to one aspect of the invention, a current collector used for a fuel cell is provided. The current collector includes a first metal plate that has a terminal portion and is conductive, and a second metal plate and a third metal plate that are metal plates having a higher corrosion resistance than the first metal plate and pinch the first metal plate therebetween. The current collector includes a first through-hole penetrating the first metal plate, the second metal plate, and the third metal plate, wherein fluid exists in at least either one of between the first metal plate and the second metal plate, and between the first metal plate and the third metal plate, and the first through-hole guides the fluid outside the current collector. A hole wall surface of the first through-hole is not blocked.

According to the current collector of this aspect, since the current collector having a stacked structure in which metal plates made of different metals has the first through-hole of which the hole wall surface is not blocked, air between the metal plates can be escaped outside via the first through-hole when the first to third metal plates are stacked, and then pressed in stacking directions of the metal plates before blocking the end face of the perimeter of the current collector with the first seal member. Thus, poor joining of the end face of the perimeter of the current collector, which is caused by air between the metal plates outflowing from between the first seal member and the metal plates, can be reduced. As the result, the end face of the perimeter of the current collector is suitably blocked by the first seal member, and corrosion of the current collector caused by moisture entering into the end face of the perimeter of the current collector can be reduced.

(2) In the current collector of the aspect described above, the current collector may include a second through-hole penetrating the first metal plate, the second metal plate, and the third metal plate, and the second through-hole supplies or discharges reactive gas or refrigerant for the fuel cell, and a second seal member blocking a hole well surface of the second through-hole. Thus, the poor joining caused by air between the metal plates outflowing from between the first seal member or the second seal member and the metal plates can be reduced. As the result, corrosion of the current collector caused by moisture entering into the end face of the perimeter of the current collector and the hole wall surface of the second through-hole can be reduced.

(3) According to another aspect of the invention, a fuel cell stack is provided. The fuel cell stack includes a stacked body formed by stacking a plurality of unit cells, the current collector of the previous aspect, and a plate arranged outside the current collector, and without any through-hole at a position corresponding to the first through-hole. Thus, since the first through-hole of the current collector is blocked by the plate, the hole wall surface of the first through-hole will not be exposed to air outside the fuel cell stack. Therefore, corrosion of the current collector can be reduced without the hole wall surface of the first through-hole being blocked, because the hole wall surface will not be exposed to air outside the fuel cell stack even when the air becomes high in humidity.

(4) In the fuel cell stack of the aspect described above, the plurality of unit cells may have a third through-hole communicating with the first through-hole of the current collector. Thus, since the first through-hole communicates with the third through-hole when the current collector is arranged at an end of the stacked body, the first through-hole can also function as an alignment hole when assembling the fuel cell stack.

Note that the present invention can be implemented in various forms. For example, the invention can be implemented in forms, such as a fuel cell system provided with the fuel cell stack, and a movable body to which the fuel cell system is mounted.

BRIEF DESCRIPTION OF THE DRAWINGS

The present disclosure is illustrated, by way of example and not by way of limitation in the figures of the accompanying drawings, in which the like reference numerals indicate like elements and in which.

DESCRIPTION OF THE EMBODIMENTS

A. Embodiment

A1. Structure of Fuel Cell Stack

Figure 1:
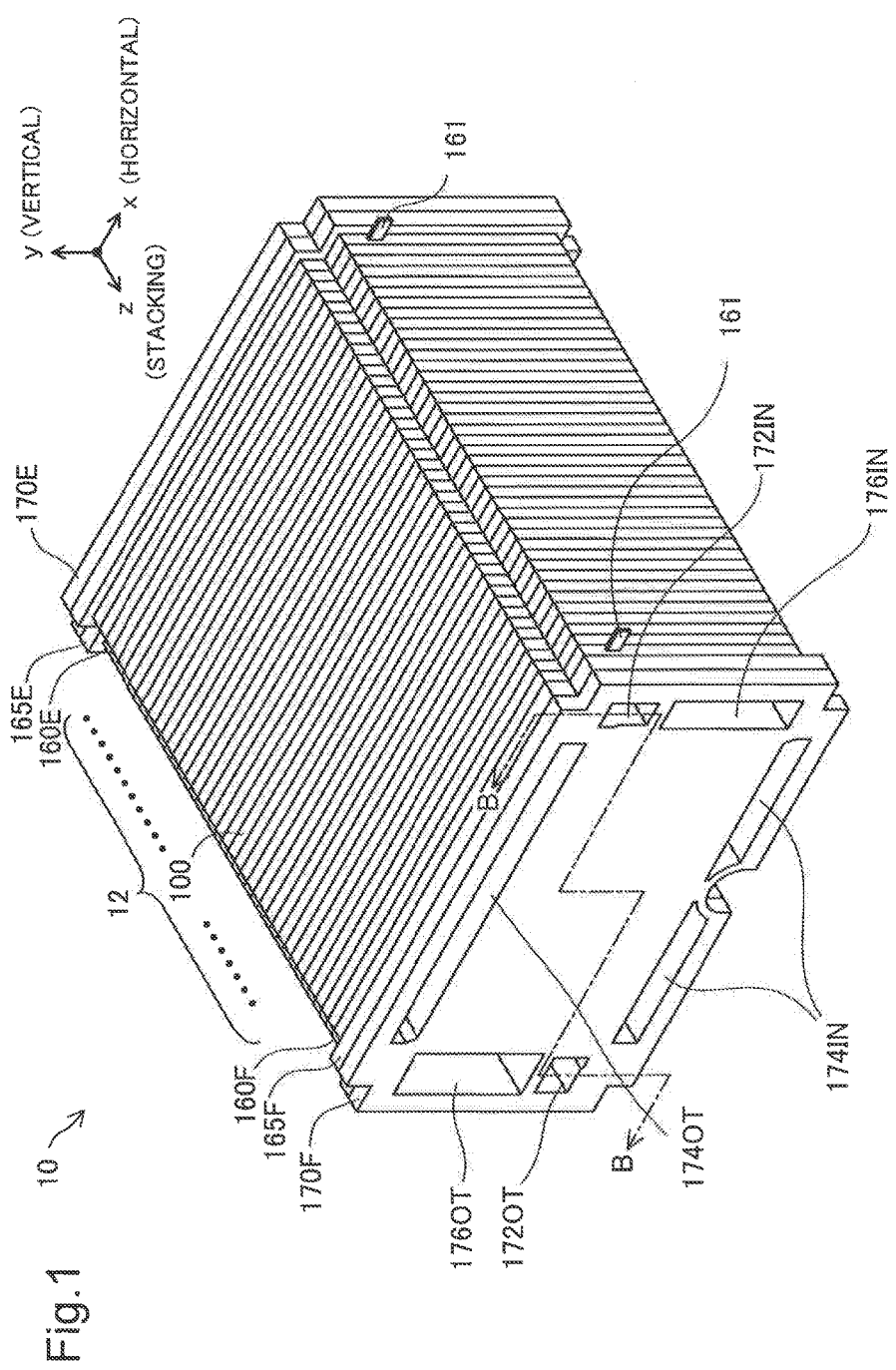
FIG. 1 is a perspective view schematically illustrating a structure of a fuel cell stack as one embodiment of the invention.

FIG. 1 is a perspective view schematically illustrating a structure of a fuel cell stack as one embodiment of the invention. A fuel cell stack 10 has a stacked structure in which a stacked body 12 which is formed by stacking a plurality of unit cells 100 (each serves as a power generator) in Z-directions illustrated in FIG. 1 (hereinafter, also referred to as a "stacking direction") is pinched between end plates 170F and 170E via current collectors 160E and 160E and insulating plates 165F and 165E, respectively. Each of the unit cells 100 the current collectors 160F and 160E, the insulating plates 165F and 165E, and the end plates 170F and 170E has a plate structure of a substantially rectangular plate shape (in detail, four corners of the rectangle is cut out squarely, and the center of one of long sides is removed in a substantially semicircular shape), and the long sides are oriented in x-direction (horizontal) illustrated in FIG. 1 and short sides are oriented in y-direction (perpendicular to the x-direction; vertical) illustrated in FIG. 1, in the following description, positive in the z-axis direction in FIG. 1 represents front or forward, and negative in the z-axis direction in FIG. 1 represents rear or rearward. Note that, generally the fuel cell stack 10 in this embodiment is also referred to as a "fuel cell."

The end plate 170F and the insulating plate 165F, and the current collector 160F which are located on a front end side have a fuel gas supply hole 172IN and a fuel gas discharge hole 172OT, oxidizing gas supply holes 174IN and an oxidizing gas discharge hole 174OT, and a cooling water supply hole 176IN and a cooling water discharge hole 176OT. Hereinafter, such supply holes and discharge holes are also collectively referred to as "supply and discharge holes." These supply and discharge holes are coupled to respective holes (not illustrated) formed at corresponding positions of each unit cell 100, and constitute supply manifolds and discharge manifolds for gas or cooling water corresponding to the respective holes. On the other hand, these supply and discharge holes are not formed in the end plate 170E, the insulating plate 165E, and the current collector 160E which are located on a rear end side. This is because the fuel cell is a type of fuel cell in which reactive gas (fuel gas and oxidizing gas) and cooling water are supplied from the end plate 170F on the front end side to each unit cell 100 via the supply manifolds, and discharging gas and discharging water (cooling water) from each unit cell 100 are discharged to outside from the end plate 170F on the front end side via the discharge manifolds. Note that the fuel cell may be, but not be limited to the type described above, various types, such as a type in which the reactive gas and the cooling water are supplied, from the end plate 170F on the front end side, and the discharging gas and the discharging water (cooling water) are discharged outside from the end plate 170E on the rear end side. In this embodiment, the cooling water is a heat carrier for cooling or heating the unit cells 100 to a target temperature, and corresponds to refrigerant in the claims.

Each opening of the oxidizing gas supply holes 174IN is elongated in the x-directions (long-side directions) in an outer edge portion at a lower end of the end plate 170F on the front end side, and an opening of the oxidizing gas discharge hole 174OT is elongated in the x-directions in an outer edge portion at an upper end. The fuel gas supply hole 172IN is arranged at an upper end in the y-directions (short-side directions) of an outer edge portion at a right end in the drawing of the end plate 170E on the front end side, and the fuel gas discharge hole 172OT is arranged at a lower end in the y-directions of an outer edge portion at a left end in the drawing. An opening of the cooling water supply hole 176IN is elongated in the y-directions below the fuel gas supply hole 172IN and an opening of the cooling water discharge hole 176OT is elongated in the y-directions above the fuel gas discharge hole 172OT. Note that in the unit cells 100, each of the supply and discharge holes described above is branched into a plurality of supply and discharge holes as will be described later.

Figure 2:
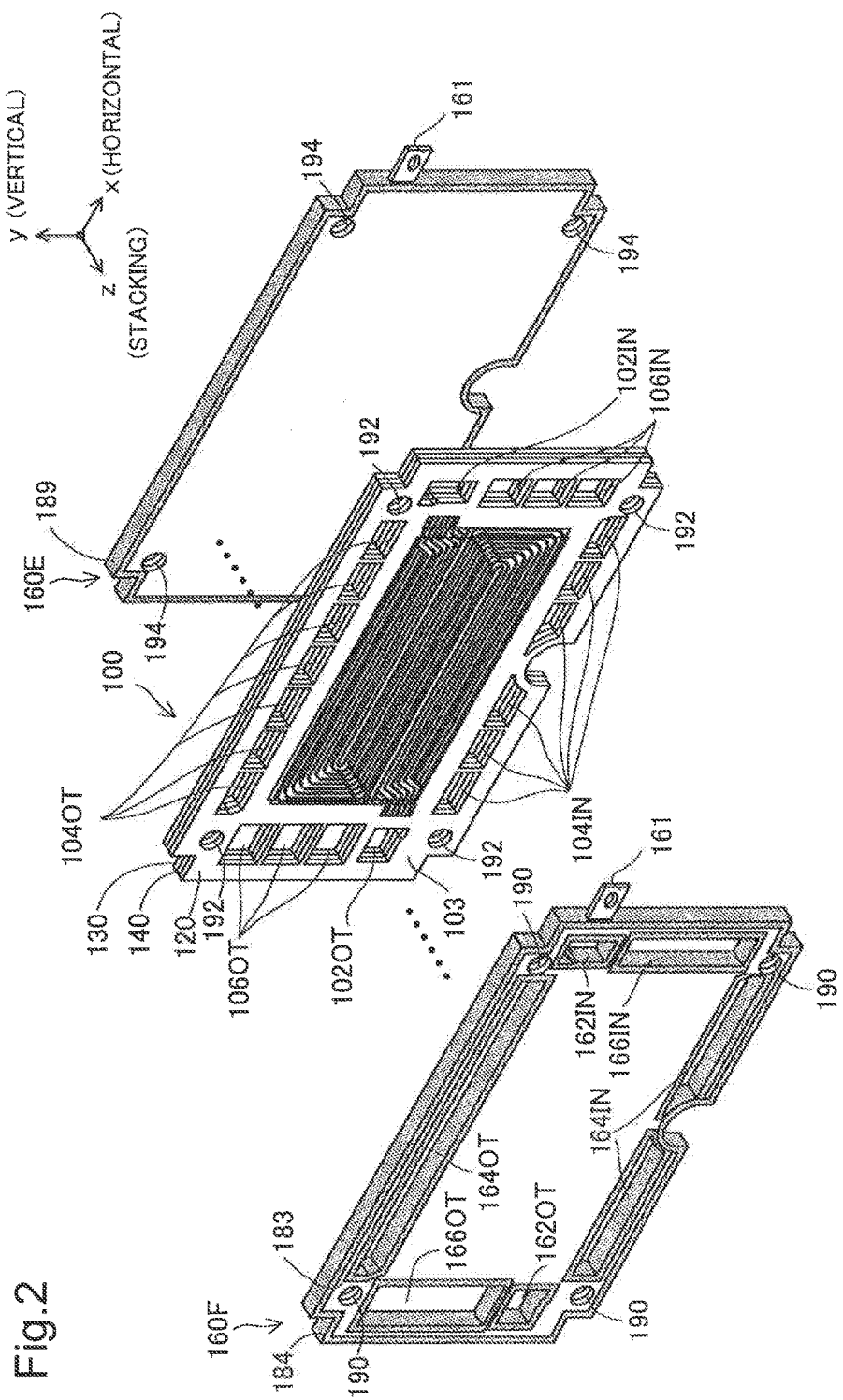
FIG. 2 is a view schematically illustrating a situation of arranging a current collector, unit cells, and another current collector.

FIG. 2 is a view schematically illustrating a situation of arranging the current collector 160F, the unit cells 100, and the current collector 160E. The current collector 160E on the front end side and the current collector 160E on the rear end side collect generated power of each unit cell 100, and output, the collected power to outside via current collection terminals 161. Hereinafter, if the current collectors 160F and 160E are not needed to be distinguished from each other, they are collectively referred to as a "current collector 160." A structure of the current collector 160 will be described in detail later.

Each unit cell 100 includes an anode-side separator 120 made of titanium, a cathode-side separator 130 made of titanium, and a sealing member integrated membrane electrode assembly (MEA) 140. Each unit cell 100 includes, in a periphery edge portion thereof, a fuel gas supply hole 102IN and a fuel gas discharge hole 102OT, six oxidizing gas supply holes 104IN and seven oxidizing gas discharge holes 104OT, and three cooling water supply holes 106IN and three cooling water discharge holes 106OT. These supply and discharge holes are connected with the fuel gas supply hole 172IN in the end plate 170F etc. When the plurality of unit cells 100 are stacked to form the fuel cell stack 10, these supply and discharge holes forms manifolds which supply the fuel gas, oxidizing gas and cooling water to each unit cell 100, and manifolds which discharges the fuel gas, oxidizing gas, and cooling water from each unit cell 100. Note that a seal portion (not illustrated) is formed in the perimeter of each of the supply and discharge holes described above to secure sealing of the manifold between the separators and between the separator and the current collector, when the unit cells 100 are stacked.

The unit cell 100 includes alignment through-holes 192 at four corners thereof. When stacking the plurality of unit cells 100, the unit cells NO are stacked using a stacking jig having four rods, which can be inserted into the alignment through-holes 192, at four positions corresponding to the alignment through-holes 192 so that the plurality of unit cells 100 can be stacked appropriately without any mutual offsets. The alignment through-holes 192 in this embodiment correspond to a third through-hole in the claims. Note that each of the unit cells 100, the current collectors 160F and 160E, the insulating plates 166F and 165E, and the end plates 170F and 170E is cut out at four corners of the rectangular plate shape in the shape of square, respectively, one of the long sides is cut out in the substantially semicircle at the center, and the plate shape is not apparently an exact rectangular shape. However, the plate shape is herein deemed to be a "substantially rectangular shape" as a whole, and the arrangement of the alignment through-holes 192 is expressed as "at four corners." The same can be said for the current collectors 160F and 160E which will be described in detail later.

The anode-side separator 120 and the cathode-side separator 130 may be made of material having a gas-shield property and an electron conductive property, which is not limited to the material described in this embodiment. For example, the material may be carbon material which may be made by compressing carbon particles to make it gas impermeable, or stainless steel, aluminum, or alloy of these materials. Note that since each plate is normally exposed to the cooling water, the plate is preferred to be made of metal having a high corrosion resistant property.

A2. Structure of Current Collector

Figure 3:
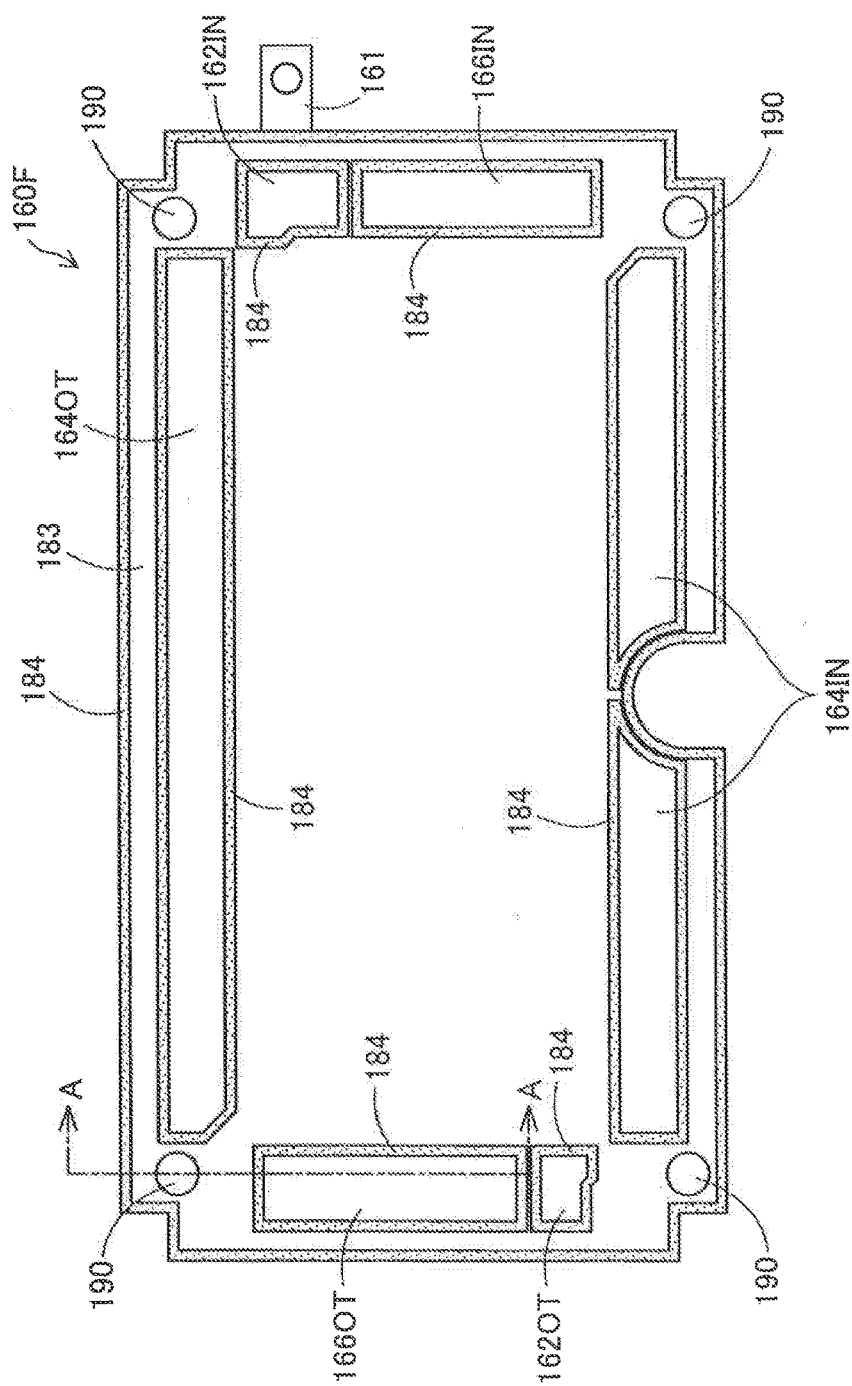
FIG. 3 is a planar view illustrating a current collector as one embodiment of the invention.
Figure 4:
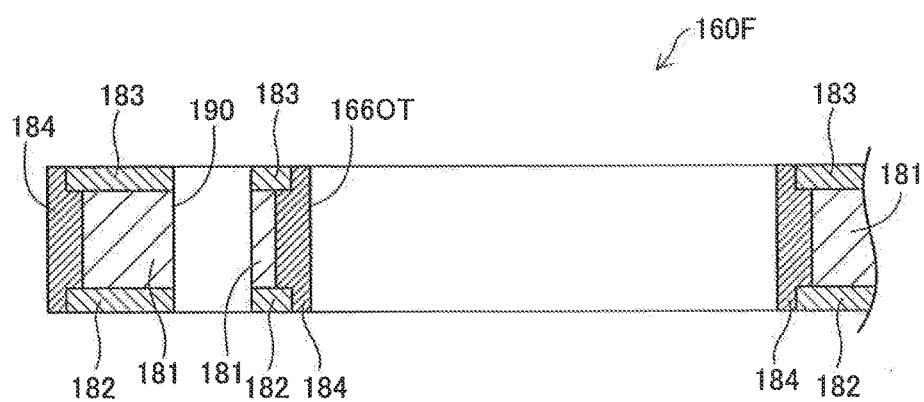
FIG. 4 is a cross-sectional view illustrating a structure of the current collector.

FIG. 3 is a planar view illustrating the current collector 160F as one embodiment of the invention. In FIG. 3, a surface of the current collector 160F on the front end side, which contacts the insulating plate 165F. FIG. 4 is a cross-sectional view illustrating a structure of the current collector 160F. In FIG. 4, the cross-sectional view taken along a line A-A in FIG. 3 is schematically illustrated. The current collector 160E of this embodiment is a metal plate having a three-layer structure in which a second metal plate 182 and a third metal plate 182 (FIG. 4) which are made of titanium are stacked onto both sides (both plate surfaces) of the first metal plate 181 (FIG. 4) made of aluminum which has the current collection terminal 161 (FIG. 3). In this embodiment, the first metal plate 181 has a thickness of about 1.0 mm, and the second and third metal plates 182 and 183 have thicknesses of about 0.2 mm.

As illustrated in FIG. 3, a perimeter edge portion of the current collector 160F includes a fuel gas supply hole 162IN and a fuel gas discharge hole 162OT, oxidizing gas supply holes 164IN and an oxidizing gas discharge hole 164OT, and a cooling water supply hole 166IN and a cooling water discharge hole 166OT. When the plurality of fuel cells are stacked to form the fuel cell stack, these supply and discharge holes are connected with the corresponding supply and discharge holes of the end plate and the unit cells to function as parts of manifolds for supplying or discharging reactive gas or cooling water to/from the unit cells.

Further, vent holes 190 are formed at four corners of the current collector 160F. The vent holes 190 are through-holes for guiding air between the first and second metal plates 181 and 182, and air between the first and third metal plates 181 and 183, outside the current collector 160E as described in detail later. The vent holes 190 of the current collector 160F are formed at positions corresponding to the alignment through-holes 192 of each unit cell 100, and are formed in a circular shape having substantially the same diameter. Thus, when the current collector 160F is arranged outside the stacked body 12 in which the plurality of unit cells 100 are stacked, communicating holes which penetrate in the stacking directions are formed. Each of the vent holes 190 in this embodiment corresponds to a first through-hole in the claims, and each of the supply and discharge holes corresponds to a second through-hole in the claims.

As illustrated in FIGS. 3 and 4, an end face of the perimeter of the current collector 160F and wall surfaces of the supply and discharge holes 162IN, 162OT, 164IN, 164OT, 166IN and 166OT (hereinafter, also referred to as "the hole wall surfaces") are covered with adhesive seal member 184. In this embodiment, ethylene-propylene-diene rubber (EPDM) which has sealing, elastic, and adhesive properties is used as the adhesive seal member 184. The current collector 160F of this embodiment adopts a structure in which plates made of different metals (aluminum and titanium) are contacted to each other. It is generally known that an electric corrosion circuit is formed due to a potential difference between the different metals when the different metals are contacted, and corrosion occurs when the metals are exposed to moisture. Since reactive gas or cooling water flows through each of the supply and discharge holes in the current collector 160F, the hole wall surfaces are exposed to moisture. The perimeter of the current collector 160F is also exposed to moisture outside the fuel cell stack 10. In the current collector 160F of this embodiment, since the end face of the perimeter and the hole wall surfaces of the supply and discharge holes are covered with the adhesive seal member 184, a contact with various moisture can be prevented, thereby reducing corrosion of the current collector 160F. Among the entire adhesive seal member 184 in this embodiment, part of the adhesive seal member 184 which covers the end face of the perimeter of the current collector 160F corresponds to a first seal member in the claims, and another part of the adhesive seal member 184 which covers the hole wall surfaces of the supply and discharge holes 162IN, 162OT, 164IN, 164OT, 166IN and 166OT corresponds to a second seal member.

Here, outline of a manufacturing process of the current collector 160F is described briefly. The first metal plate 181 is stacked on the second metal plate 182, and a clay-like adhesive seal member 184 is applied to the stacked plate assembly in detail, a frame-shaped adhesive seal member 184 surrounding the perimeter of the first metal plate 181 is attached to the perimeter of the first metal plate 181, and frame-shaped adhesive seal members 184 along inner circumferences of the supply and discharge holes are attached to the supply and discharge holes. The third metal plate 183 is then stacked on the first metal plate 181. Thus, the first, second, and third metal plates 181, 182 and 183 are stacked, and the adhesive seal members 184 are attached. Then, the product is heated for a predetermined time in a state where the product is pressed in the stacking directions, and is then cooled. As the result, the first, second, and third metal plates 181, 182 and 183 are adhered with the adhesive seal members 184. Here, as illustrated in FIG. 4, the end face of the perimeter of the current collector 160F and the hole wall surface of the cooling water discharge hole 166OT are covered and blocked with the adhesive seal members 184. Similarly, the hole wall surfaces of the fuel gas supply hole 162IN, the fuel gas discharge hole 162OT, the oxidizing gas supply holes 164IN, the oxidizing gas discharge hole 164OT, the cooling water supply hole 166IN, and the cooling water discharge hole 166OT are covered and blocked with the adhesive seal members 184. As illustrated in FIGS. 3 and 4, hole wall surfaces of the vent holes 190 provided to the current collector 160F are neither covered nor blocked.

Although the current collector 160E on the rear end side is different from the current collector 160F on the front end side in terms of the existence of the supply and discharge holes as described above, other structures are almost the same. That is, the current collector 160E is, similar to the current collector 160F, a metal plate having a three-layer structure in which second and third metal plates made of titanium are stacked on both sides of a first metal plate made of aluminum having the current collection terminal 161 (FIG. 2), and an end face of the perimeter thereof is covered and blocked with adhesive seal member 189 (FIG. 2). Further, vent holes 194 similar to the vent holes 190 are formed at positions corresponding to the vent holes 190 in the current collector 160F. Hole wall surfaces of the vent holes 194 are not blocked, similar to the vent holes 190. The vent holes 194 in this embodiment corresponds to the first through-hole in the claims, and the adhesive seal member 189 corresponds to the first seal member in the claims.

A3. Effects of Embodiment

Figure 5:
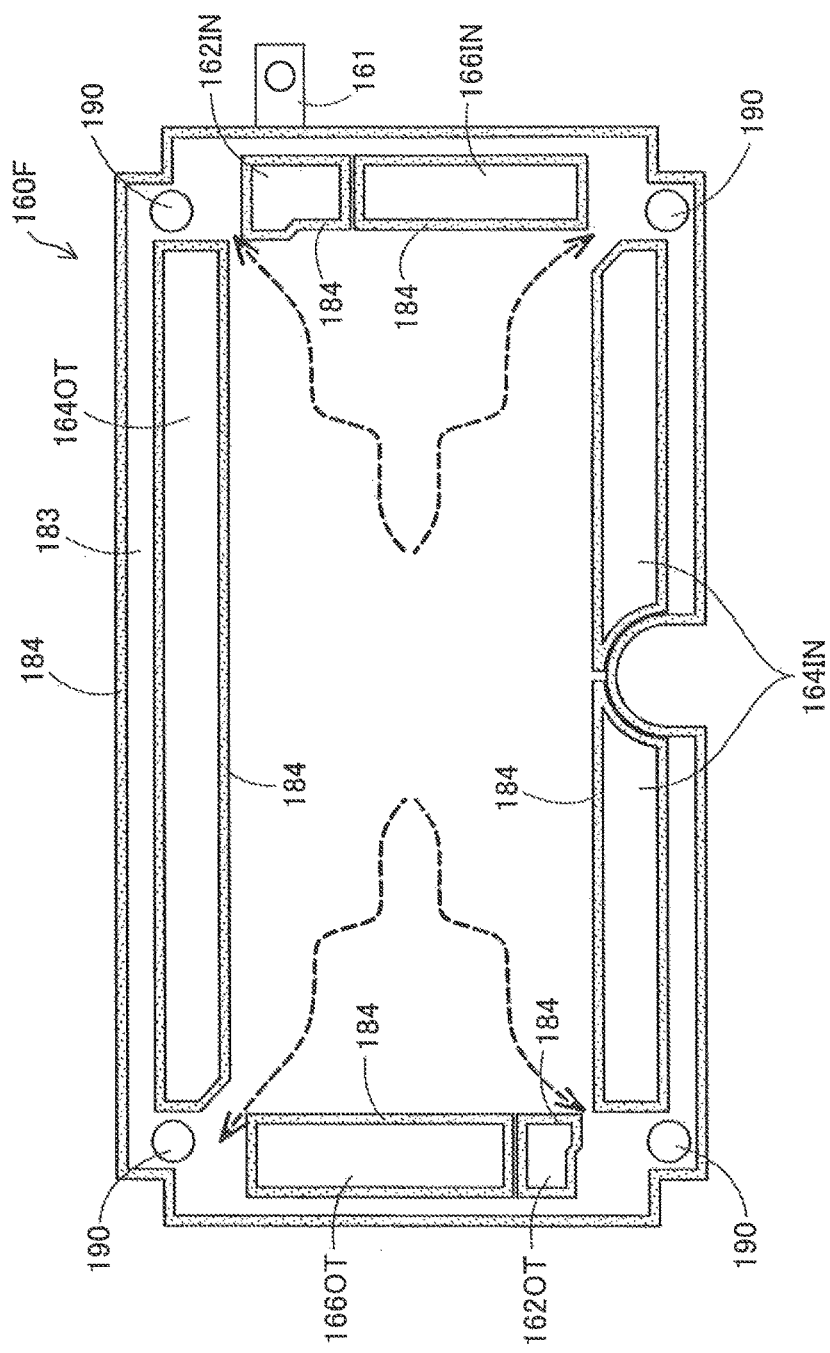
FIG. 5 is a planar view illustrating the current collector (and illustrating effects)
Figure 6:
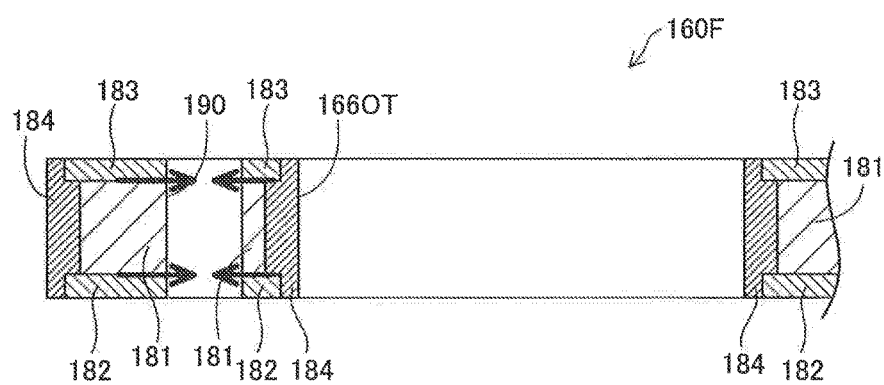
FIG. 6 is a cross-sectional view illustrating the current collector (and illustrating effects)

FIGS. 5 and 6 are views illustrating effects of the current collector 160F as one embodiment of the invention. FIG. 5 is a planar view of the current collector 160F, and FIG. 6 is a cross-sectional view of the current collector 160F. In the current collector 160F of this embodiment, the end face of the perimeter and the hole wall surfaces of the supply and discharge holes are covered and adhered with the adhesive seal members 184. On the other hand, the hole wall surfaces of the vent holes 190 are neither covered nor blocked. As described above, when manufacturing the current collector 160F, the first, second, and third metal plates 181, 182 and 183 which are stacked are attached with the adhesive seal members 184 and are then pressed. The product is heated for the predetermined time, and is then cooled to adhere the first, second, and third metal plates 181, 182 and 183 with the adhesive seal members 184. Since the hole wall surfaces of the vent holes 190 are not blocked, as illustrated in FIGS. 5 and 6, air between the first metal plate 181 and the second metal plate 182, and air between the first metal plate 181 and the third metal plate 183 are allowed to escape outside the current collector 160F via the vent holes 190 (flows of air are illustrated in FIGS. 5 and 6 by arrows). Thus, when manufacturing the current collector 160F, a poor adhesion due to air between the first metal plate 181 and the second metal plate 182, or air between the first metal plate 181 and the third metal plate 183 outflowing from between the adhesive seal member 184 and the second metal plate 182, or between the adhesive seal member 184 and the third metal plate 183 during hardening of the adhesive seal members 184 (during the cooling described above) can be reduced. As the result, the end face of the perimeter and the hole wall surfaces of the supply and discharge holes of the current collector 160F are suitably blocked with the adhesive seal members 184, thereby reducing the corrosion of the current collector 160F due to moisture entering into the end face of the perimeter and the hole wall surfaces of the supply and discharge holes of the current collector 160F. Note that in this embodiment, a case where the current collector 160 is manufactured in air, and the air exists between the first metal plate 181 and the second metal plate 182 or between the first metal plate 181 and the third metal plate 183 is illustrated. However, the fluid which exists between the first metal plate 181 and the second metal plate 182 or between the first metal plate 181 and the third metal plate 183 may be, but not limited to, but other various fluids, such as steam or other gaseous matters.

Figure 7:
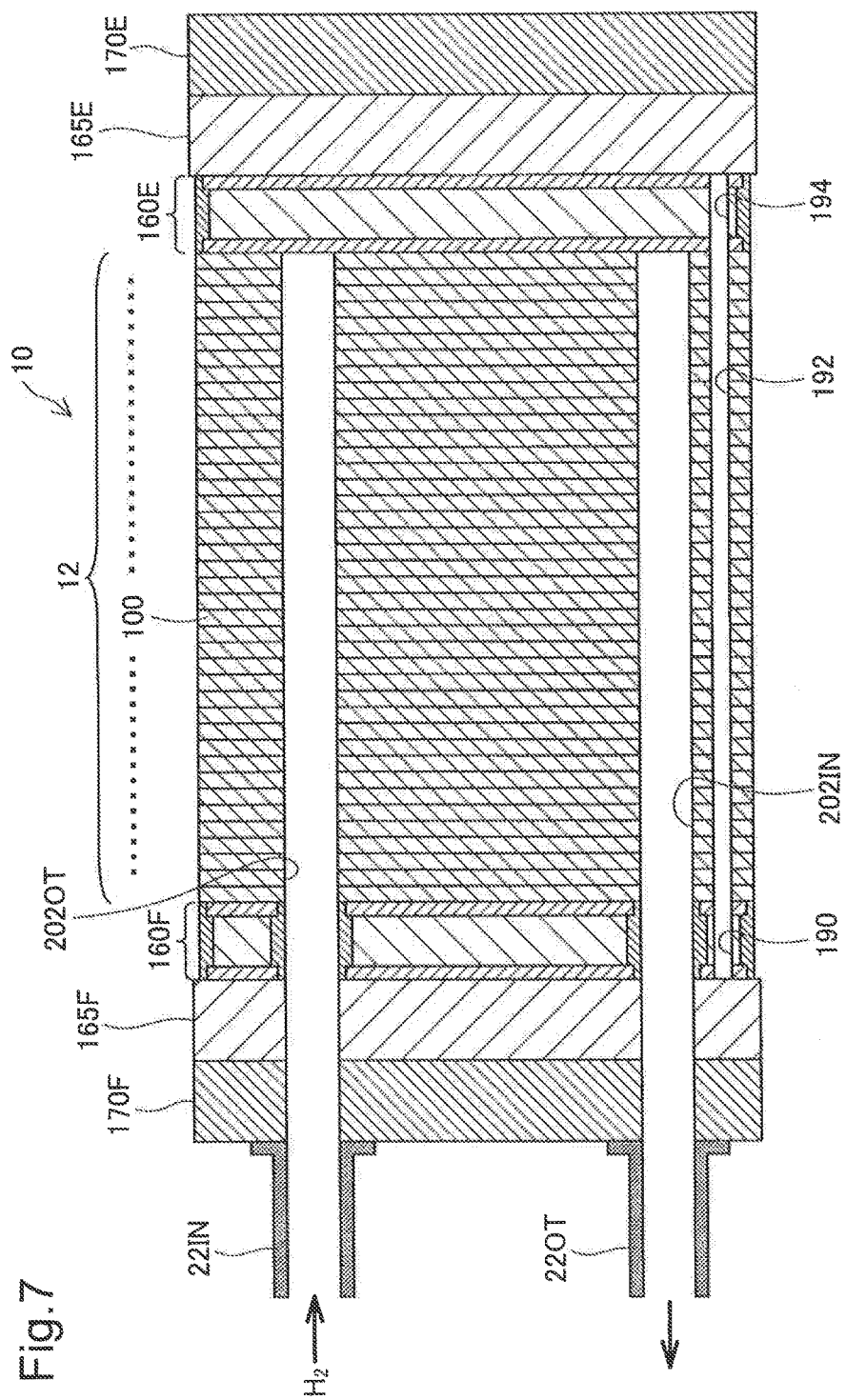
FIG. 7 is a cross-sectional view illustrating the structure of the fuel cell stack.

FIG. 7 is a cross-sectional view illustrating a structure of the fuel cell stack 10. In FIG. 7, a cross section taken along a line B-B in FIG. 1 is schematically illustrated. Further, in FIG. 7, a fuel gas supply piping 22IN and a fuel gas discharge piping 22OT are illustrated. As described above, the vent holes 190 of the current collector 160F and the vent holes 194 of the current collector 160E are formed in the shape of circle having substantially the same diameter as the alignment through-holes 192 of the unit cells 100 at positions corresponding to the alignment through-holes 192. Thus, as illustrated in FIG. 7, the current collector 160F and the current collector 160E are arranged on both sides of the stacked body 12 in which the plurality of unit cells 100 are stacked to form the communicating holes which penetrate in the stacking directions. As illustrated in FIGS. 3 and 4, the hole wall surfaces of the vent holes 190 of the current collector 160F are neither covered nor blocked. Similarly; the hole wall surfaces of the vent hole 194 of the current collector 160E are neither covered nor blocked. As illustrated in FIG. 7, in the fuel cell stack 10, the insulating plate 165F is arranged outside the current collector 160F, and the insulating plate 165E is arranged outside the current collector 160E. No through-hole is formed in the insulating plates 101E and 165E at positions corresponding to the vent holes 190 and 194, and the communicating holes each of which is formed by the vent hole 190, the alignment through-hole 192 and the vent hole 194 is blocked by the insulating plates 165E and 165E. As the result, the hole wall surfaces of the vent holes 190 and 194 are not exposed to air outside the fuel cell stack 10. Therefore, according to the fuel cell stack 10 of this embodiment, for example, when air outside the fuel cell stack 10 becomes high in humidity, the corrosions of the current collectors 160E and 160F can be reduced because the vent holes 190 and 194 are not exposed to the high humidity air even if the hole wall surfaces of the vent holes 190 and 194 are not blocked. The insulating plates 165F and 165E in this embodiment correspond to a plate in the claims. Note that the insulating plate 165F and the insulating plate 165E may be provided with through-holes corresponding to the vent holes 190 and 194. In this case, the vent holes 190 and 194 are blocked by the end plates 170F and 170E, respectively. Here, the end plates 170F and 170E correspond to the plate in the claims.

Further, in this embodiment, the vent holes 190 and 194 are located at positions communicating with the alignment through-holes 192, when the current collectors 160E and 160E are arranged at both ends of the stacked body 12, as illustrated in FIG. 7. Therefore, the vent holes 190 and 194 also function as alignment holes when assembling the fuel cell stack 10.

B. Modifications

Note that the present invention can be implemented in various forms without departing from the scope of the invention, without being limited to the embodiments described above. For example, technical features in the embodiments corresponding to technical features of each aspect cited in the section of "SUMMARY OF THE INVENTION," can suitably be substituted and/or combined in order to achieve some or all of the subjects described above: or in order to obtain some or all of the effects described above. The technical features can suitably be deleted if they are not described as essential matters in this specification. For example, the following modifications may also be possible.

(1) In the embodiments described above, although each unit cell 100 is provided with the alignment through-holes 192, the unit cell 100 may not be provided with the alignment through-holes 192, without limiting to the structure of the embodiments described above. Further, the alignment through-holes provided to the unit cell 100 may not be formed at the positions corresponding to (the positions communicating with) the vent holes 190 and 194 provided to the current collectors 160F and 160E.

(2) The number, shape, and positions of the vent holes 190 and 194 provided to the current collectors 160F and 160E are not limited to the number, shape, and positions as illustrated in the embodiments described above, but may suitably be selected. Note that it is desirable that the four vent holes are formed at four corners of the current collector like the embodiments described above, because air between the first metal plate 181 and the second metal plate 182, and air between the first metal plate 181 and the third metal plate 183 can easily be escaped. Further, it is desirable that the vent holes 190 and 194 are provided at positions corresponding to the alignment through-holes 192 formed in each unit cell 100 because the vent holes 190 and 194 can also be used for alignment. Further, the plate shape of the current collectors 160F and 160E is not limited to the shape, illustrated in the embodiments described above. For example, the plate shapes may by a rectangular shape (including a square shape) in which no notch is formed, or may be a rectangular shape in which corners are rounded. Further, the plate shape may also be a circular or polygonal shape.

(3) The material of the first metal plate 181 is not limited to aluminum as illustrated in the embodiments described above. The material of the first metal plate 181 may be other material, such as gold, silver, or copper, that has conductivity. However, the metal plate made of aluminum is preferred in terms of reductions in cost and weight. The thickness of the first metal plate 181 is not limited to about 1.0 mms, and may suitably be selected. For example, the thickness may be 1.5 to 5.0 mm. The material of the second and third metal plates 182 and 183 is not limited to titanium as illustrated in the embodiments described above. The material of the second and third metal plates 182 and 183 may be other metals, such as stainless steel, that have a higher corrosion resistance than the first metal plate 181. Note that the thickness of the second and third metal plates 182 and 183 is not limited to about 0.2 mm, and may suitably be selected. For example, the thickness may be 0.1 to 1.0 mm.

(4) The material of the adhesive seal member 184 is not limited to ethylene-propylene-diene rubber (EPDM) as illustrated in the embodiments described above. The material of the adhesive seal member 184 may be other materials, such as nitrile rubber or nitrile butadiene rubber (NBR) or fluororubber (FKM), that, have sealing and elastic properties. Although the end face of the perimeter of the current collector 160F and the hole wall surfaces of the supply and discharge holes 162IN, 162OT, 164IN, 164OT, 166IN and 166OT are covered with the adhesive seal member 184 made of the same material in the embodiment described above, the end face of the perimeter of the current collector 160F and the hole wall surfaces of the supply and discharge holes 162IN, 162OT, 164IN, 164OT, 166IN and 166OT may be covered with seal members made of different materials. For example, the end face of the perimeter of the current collector 160F may be blocked with material which is lower in adhesiveness than EPDM. It is preferred that the supply and discharge holes 162IN, 162OT, 164IN, 164OT, 166IN and 166OT are covered and blocked with material(s) which are high in adhesiveness (i.e., the first, second, and third metal plates are firmly adhered) because the hole wall surfaces of the supply and discharge holes are exposed to high humidity due to the reactive gas and the cooling water which flow in the supply and discharge holes.

What is claimed is:

1. A current collector for a fuel cell, comprising a first metal plate that has a terminal portion and is conductive, and a second metal plate and a third metal plate that are metal plates having a higher corrosion resistance than the first metal plate and pinch the first metal plate therebetween, wherein the current collector includes:
   one or more first through-holes penetrating the first metal plate, the second metal plate, and the third metal plate, wherein fluid exists in at least either one of between the first metal plate and the second metal plate, and between the first metal plate and the third metal plate, and the one or more first through-holes guide the fluid, outside the current collector; and
   a first seal member blocking an end face of a perimeter of the current collector across end faces of the first metal plate, the second metal plate, and the third metal plate and surrounding an area including the one or more first through-holes,
   wherein a hole wall surface of the one or more first through-holes is not blocked.

2. The current collector in accordance with claim 1, wherein the current collector includes:
   a second through-hole penetrating the first metal plate, the second metal plate, and the third metal plate, and the second through-hole supplies or discharges reactive gas or refrigerant for the fuel cell; and
   a second seal member blocking a hole wall surface of the second through-hole.

3. The current collector in accordance with claim 2, wherein the second seal member is made of ethylene-propylene-diene rubber.

4. The current collector in accordance with claim 1, wherein:
   the current collector is formed in a substantially rectangular plate shape,
   the one or more first through-holes include four first through-holes, and
   each of the four first through-holes is respectively formed at a different corner of the current collector.

5. The current collector in accordance with claim 1, wherein the first metal plate is made of aluminum, and the second metal plate and the third metal plate are made of titanium.

6. A fuel cell stack, comprising:
   a stacked body formed by stacking a plurality of unit cells;
   the current collector in accordance with claim 1; and
   a plate arranged outside the current collector, and without any through-hole at a position corresponding to the one or more first through-holes.

7. The fuel cell stack in accordance with claim 6, wherein the plurality of unit cells has a third through-hole communicating with the one or more first through-holes of the current collector.

8. The fuel cell stack in accordance with claim 6, wherein the plate is an insulating plate.

* * * * *